Aug. 10, 1926.

E. B. SHAND 1,595,737

EXCITATION OF SYNCHRONOUS CONVERTER COMMUTATING POLES

Filed April 11, 1922

WITNESSES:
H. B. Funk
O. B. Buchanan

INVENTOR
Errol B. Shand.
BY
Wesley G. Carr
ATTORNEY

Patented Aug. 10, 1926.

1,595,737

UNITED STATES PATENT OFFICE.

ERROL B. SHAND, OF PITTSBURGH, PENNSYLVANIA, ASSIGNOR TO WESTINGHOUSE ELECTRIC & MANUFACTURING COMPANY, A CORPORATION OF PENNSYLVANIA.

EXCITATION OF SYNCHRONOUS-CONVERTER COMMUTATING POLES.

Application filed April 11, 1922. Serial No. 551,537.

My invention relates to methods and means for improving the commutation of commutating dynamo-electric machines and it has particular reference to rotary converters.

Under certain transient conditions of operation of a rotary converter, the ratio of the alternating current to direct current will vary as the result of various energy transfers in the machine itself. It follows, therefore, that the resultant armature reaction will vary in accordance with variations of the alternating and direct currents.

The total armature reaction of a rotary converter, that is, the resultant reaction obtained by integration around the entire armature circumference of the reacting effects of both the alternating and direct currents present in the armature coils during operation is normally that of a motor, or, in other words, the alternating current reaction predominates. However, if we take simply the commutating zone, that is, the region directly beneath the commutator brushes, which region is, of course, all that we are concerned with when considering commutating conditions, it has been shown mathematically and proved by tests that the normal reaction in this zone is that of a generator, or, to state it differently, the direct-current reaction is the greater.

When a heavy overload suddenly comes on a converter, it is quite common for the direct current to increase at double the rate of the alternating current. During this period the rotor is giving up some of its kinetic energy to the direct-current lines, and the generator reaction of the armature is, therefore, increased. Also, when the circuit breaker trips and interrupts the direct-current circuit, the alternating current may, conversely, be maintained at several times normal value without any opposing direct current to neutralize its action. This state of affairs will continue until the kinetic energy given up by the rotor has been restored from the alternating-current lines, the armature reaction meanwhile being that due to a motor.

To produce the proper commutating conditions in a converter, the commutating flux should be substantially proportional to the load current and in the same direction as a motor reaction. To produce this result, the mutual and self induction of the armature coils undergoing commutation should be neutralized by a component of magnetomotive force of the commutating winding which varies with the load current to force the flux against the reluctance of the magnetic circuit, and there should be a second component to neutralize the armature reaction in the commutating zone. Under stable conditions, the second component should vary with the load and should be in the same direction as the first-mentioned component. The stable conditions just mentioned are provided for by the usual series commutating winding.

When there is a superimposed transient generator reaction which has not been neutralized, there may be spitting at the brushes but the tendency to flash is not great because the voltage per bar on the trailing side of the brush is low and may even be reversed. When there is a superimposed and unneutralized motor reaction, the sparking will be at the trailing tip of the brush and will be propagated by the rotation of the commutator so that the result is a flashover.

When a short circuit is applied to a converter, there is at first an unneutralized superimposed generator reaction and a flashover rarely occurs. There occurs an unneutralized superimposed motor reaction when, or just before, the circuit breaker opens on the direct-current side and this is what causes the flashover.

The principal object of the present invention is, therefore, to provide a negative, or reversed, excitation on the commutating pole at the critical period of unneutralized motor reaction just mentioned.

A further object of my invention is to provide a commutating pole having compensating ampere turns which are varied in accordance with the direction and rate of change of the load.

With these and other objects in view, my invention consists in the methods and apparatus hereinafter disclosed and specifically recited in the appended claims.

In the accompanying drawing, Figure 1 is a diagrammatic view of circuits and apparatus embodying my invention.

Figure 1:
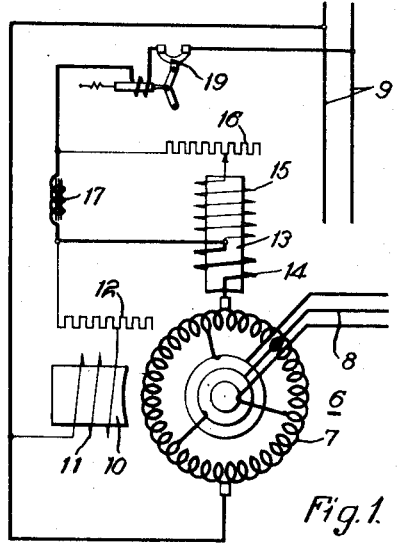

In Fig. 1 is shown a rotary converter 6 having an armature 7 connected to an alternating-current line 8 and to a direct-current line 9. The converter is also provided with main polar projections 10 carrying a winding 11 which is excited from the mains 9 through a rheostat 12, and with interpolar projections 13 which are provided with a series commutating winding 14 and an auxiliary commutating winding 15. The auxiliary winding 15 is excited, through a variable resistor 16, across a highly inductive impedance device 17, which is connected in series with one of the direct-current mains, and which may be either a self-inductance device or a transformer. A conventional circuit-breaker 19 is shown in one of the leads of the direct-current line.

Figure 2:
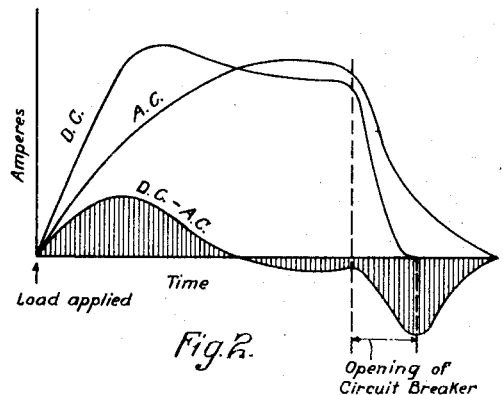
Figs. 2 and 3 are curve diagrams illustrating, respectively, the relation of the direct and alternating currents upon the application of a sudden overload and the relation of the exciting current in the auxiliary commutating coil of Fig. 1 during similar conditions.
Figure 3:
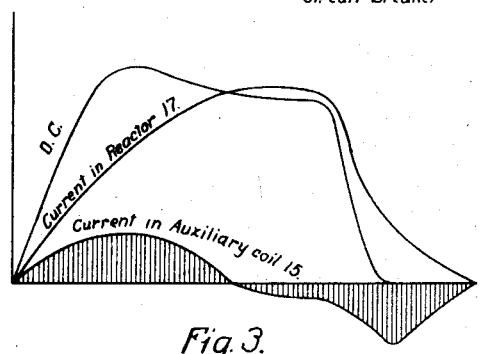

The operation of the device will be understood by reference to Figs. 2 and 3. In Fig. 2 it is shown that, when a sudden overload is applied, the direct current at first increases at a much faster rate than the alternating current. The direct current will, therefore, be larger than the alternating current for a period dependent upon the severity of the overload and the natural period of oscillation of the rotor. In the condition shown in Fig. 2, the alternating current becomes somewhat larger than the direct current prior to the opening of the circuit breaker, at which time the direct current suddenly drops to zero while the alternating current drops at a slower rate and continues for some time after the discontinuance of the direct current.

The difference between the direct and alternating currents, representing approximately the change in the armature reaction brought about by the transient load conditions, is indicated by the shaded area of Fig. 2, from which it will be seen that the most severe armature reaction occurs during and immediately after the opening of the circuit breaker, when the machine will be operating as a motor and the effect of unneutralized transient motor reaction will be most serious from the standpoint of flashover-producing conditions, by reason of the fact that the arcing is then instigated at the trailing pole tips of the brushes.

In Fig. 3 it is shown that the division of the direct current between the reactor 17 and the auxiliary coil 15 may be such that the current in the auxiliary coil is very nearly proportional, at every instant, to the difference between the direct and alternating currents as depicted in Fig. 2. When the direct current begins to increase, the reactance device opposes the increase and forces the current to go through the auxiliary coil 15 in the same direction as the total direct current. When the direct current begins to decrease, however, the induction coil 17 opposes the decrease of the current and causes a reverse current to flow in the auxiliary coil, as indicated in Fig. 3.

Figure 4:
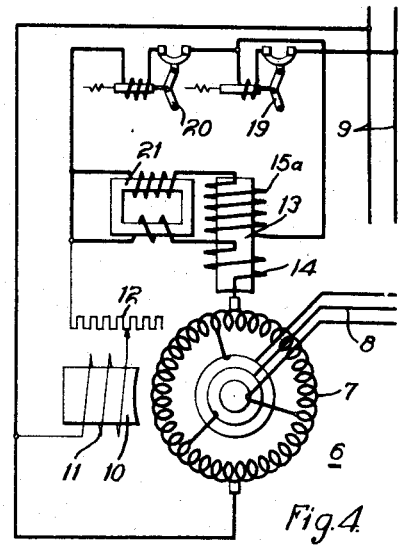
Figs. 4 and 5 are diagrammatic views of modifications of the invention shown in Fig. 1.
Figure 5:
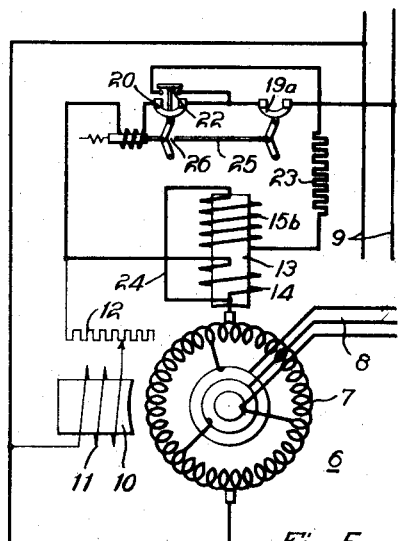

In Figs. 4 and 5 I have shown modified circuits and apparatus for securing substantially the same result as the apparatus of Fig. 1 with respect to the second, or more serious period, of the transient condition, in which the alternating current is larger than the direct current.

In the system shown in Fig. 4, the auxiliary coil 15a is excited across an auxiliary circuit breaker 20, instead of being excited across the reactor 17, as in Fig. 1. The auxiliary circuit breaker 20 is designed to open somewhat sooner than the main circuit breaker 19, as is indicated by the relative number of turns upon the trip coils of the two circuit breakers. The auxiliary coil 15a is so wound that when the circuit breaker 20 opens the magnetomotive force of the auxiliary coil is opposed to that of the main series commutating coil 14 for the purpose of establishing a proper commutating flux when, or just before, the main circuit breaker 19 opens.

Means may be provided for avoiding the short-circuited damping effect of the auxiliary coil 15a. In the modification shown in Fig. 4, this is done by providing a transformer 21 for coupling the main series circuit and the auxiliary-winding circuit noninductively. An alternative arrangement is shown in Fig. 5 wherein the auxiliary circuit breaker 20 is provided with back contacts 22 by means of which the auxiliary-winding circuit is opened when the circuit breaker is closed, and closed just before the main circuit-breaker contacts are fully opened.

In Fig. 5, an auxiliary current-limiting resistor 23 is connected in series with the auxiliary commutating winding 15b, which is therein connected, by a conductor 24, to the inner terminal of the series winding 14 in order that the latter may be entirely de-energized upon the opening of the auxiliary circuit-breaker 20. In Fig. 5 also, the main circuit-breaker 19a instead of having an individual tripping coil, is mechanically tripped by the opening of the auxiliary breaker 20, a rod 25 being provided for this purpose and spaced from the breaker 20 by an airgap 26, whereby the delayed operation of the breaker 19a is secured.

The operation of the modifications shown in Figs. 4 and 5 will be understood from the description of the embodiment shown in Fig. 1. When the auxiliary circuit breaker 20 is tripped, the auxiliary interpole coil 15a is excited in such direction as to reduce or reverse the interpole field, according to the severity of the short circuit.

While I have described my invention with particular reference to rotary converters, certain features thereof are of general application to all direct-current machines, as will be obvious to those skilled in the art.

It will be understood, therefore, that, while I have described certain characteristics of my invention in detail, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. The method of improving the commutation of a synchronous double-current commutating machine which consists in producing a normally effective commutating flux having a component which is substantially proportional to the load, and introducing a second component opposing said first-mentioned component after a predetermined time interval after the occurrence of an overload, said time interval being chosen with respect to the period of oscillation of the rotor.

2. The method of improving the commutation of a rotary converter deriving energy from an alternating-current source and supplying energy to a direct-current load which consists in producing a normally effective commutating flux having a component which is substantially proportional to the load, and reversing the commutating flux after a predetermined time interval after the occurrence of an overload, said time interval being chosen with respect to the period of oscillation of the rotor substantially as and for the purpose described.

3. The combination with a synchronous double-current commutating machine, of mechanism for improving the commutation thereof, said mechanism comprising electro-responsive means for producing a normally effective commutating flux having a component which is substantially proportional to the load, and means responsive to predetermined overloads and operative after predetermined time intervals for introducing a second component opposing said first-mentioned component.

4. The combination with an alternating-current supply circuit and a direct-current load circuit, of a rotary converter connected thereto for the interchange of power therebetween, means for producing a normally effective commutating flux having a component which is substantially proportional to the load and means responsive to predetermined overloads and operative after predetermined time intervals for introducing a second component opposing said first-mentioned component substantially as and for the purpose described.

5. The combination with a rotary converter, of an overload protective device, a commutating field winding, means for variably exciting the same, and electro-responsive means for causing a reversal of the current in said commutating field winding in the time interval between the occurrence of a predetermined sudden overload condition and the termination of the flash-producing conditions after the completion of the operation of said protective device.

6. A protective system comprising, in combination, a rotary converter having a main serially-connected commutating winding, an auxiliary serially-connected commutating winding connected in the opposite direction, means for normally rendering said auxiliary commutating winding non-effective, and means responsive to conditions tending to cause flashing for rendering said main commutating winding non-effective and said auxiliary commutating winding effective.

7. A protective system comprising, in combination, a rotary converter having a main serially-connected commutating winding, an auxiliary serially-connected commutating winding connected in the opposite direction, a main circuit breaker in series circuit relation to said windings; and an auxiliary current-responsive device operable just before the opening of said main circuit breaker for decreasing the effectiveness of said main commutating winding and increasing the effectiveness of said auxiliary commutating winding.

8. A protective system comprising, in combination, a rotary converter having a main serially-connected commutating winding, an auxiliary serially-connected commutating winding connected in the opposite direction, a main circuit breaker in series circuit relation to said windings; and an auxiliary current-responsive device operable just before the opening of said main circuit breaker for decreasing the effectiveness of said main commutating winding and increasing the effectiveness of said auxiliary commutating winding, said main and auxiliary commutating windings being in parallel one to another.

In testimony whereof, I have hereunto subscribed my name this 23rd day of March, 1922.

ERROL B. SHAND.